June 9, 1936.  J. KROFTA  2,043,622
LOG PEELING IMPLEMENT
Filed Aug. 29, 1934   2 Sheets-Sheet 1
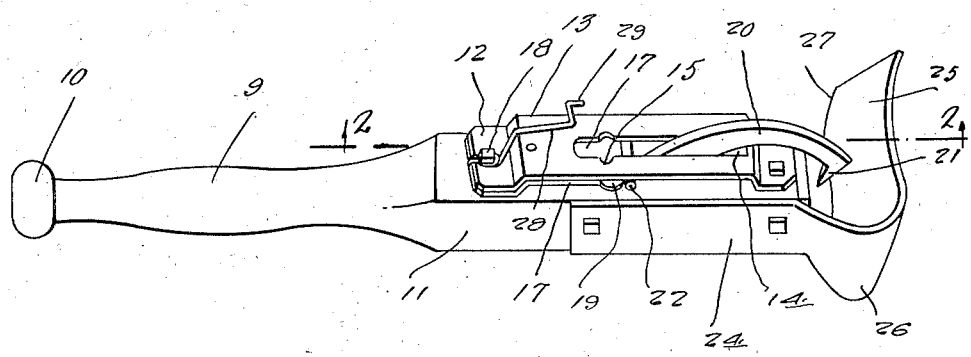
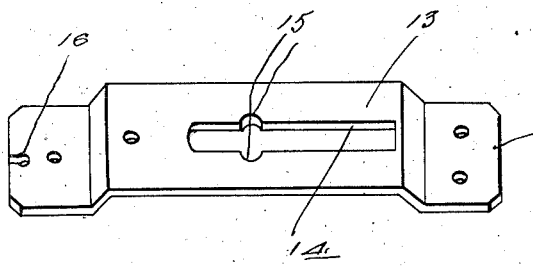
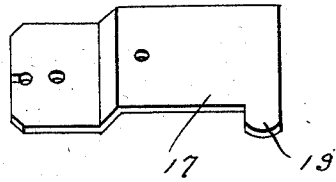
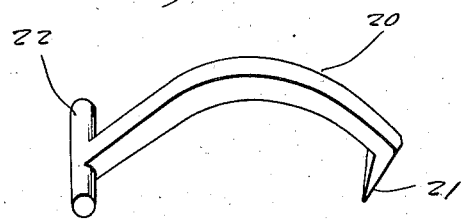
Inventor
James Krofta
By Clarence A. O'Brien
Attorney June 9, 1936.　　　　J. KROFTA　　　　2,043,622
LOG PEELING IMPLEMENT
Filed Aug. 29, 1934　　　2 Sheets-Sheet 2
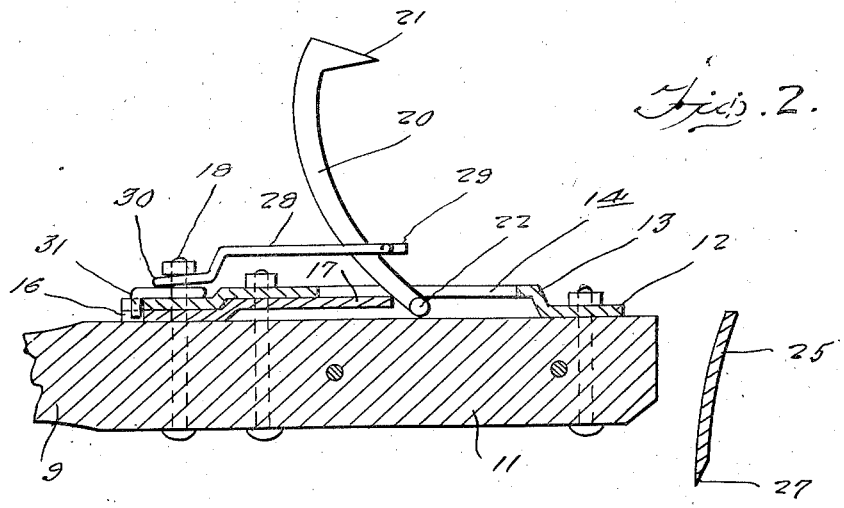
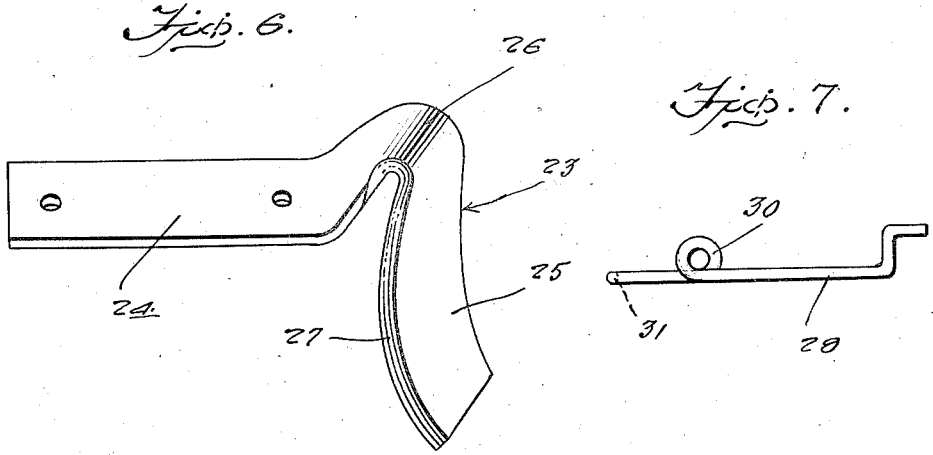
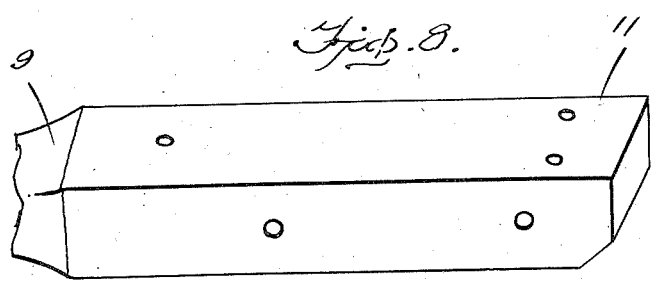
Inventor
James Krofta
By Clarence A. O'Brien
Attorney Patented June 9, 1936

2,043,622

UNITED STATES PATENT OFFICE 2,043,622

LOG PEELING IMPLEMENT

James Krofta, Ponoka, Alberta, Canada

Application August 29, 1934, Serial No. 741,985

2 Claims. (Cl. 144—208)

This invention relates to that field of invention which embraces tools and implements used in the logging industry for the purpose of handling logs and removing the bark by a process generally referred to as peeling.

Those familiar with the prior art to which the invention relates will appreciate that it is not broadly new to provide a special tool for this purpose. Having in mind, however, the defects of certain prior art devices with which I am familiar, I have been able to perfect and reduce to practice what is believed to be a specifically new type or kind of implement which permits the desired result to be accomplished more expeditiously and satisfactorily.

It follows, therefore, that it is primarily my aim to generally improve upon present known developments by providing one characterized by a careful selection of specifically different parts calculated to provide the requisite refinements and details necessary to accomplish the desired results in a superior manner.

The novel features that I consider characteristic of my invention are set forth with particularity in the concluding claims. The invention itself, however, both as to its particular construction and method of operation, together with additional objects and advantages thereof, will be best understood from the following detailed description when read in connection with the accompanying illustrative drawings.

In the drawings:

Figure 1 is a perspective view of the complete tool or implement as constructed in accordance with my ideas and inventive conception.

Figure 2 is a longitudinal sectional view disclosing the relationship of parts a little more in detail and disclosing the cant hook thrown back to an out-of-the-way or ineffective position this figure being a section on line 2—2 of Figure 1.

Figure 3 is a perspective view of the mounting or adapter plate.

Figure 4 is a corresponding type of view disclosing the complemental flat leaf retention spring for the log turning hook.

Figure 5 is a perspective view of the cant hook per se.

Figure 6 is a detail view of the bark severing and removing knife.

Figure 7 is a detail view of a holder spring for the cant hook.

Figure 8 is a perspective view of the block-like end portion of the body or handle of the tool.

Referring to Figure 1, it will be observed that the main or body portion of the implement is constructed of appropriate material and includes a suitably shaped handle 9 fashioned to accommodate both hands of the user. At one end the handle is formed with an anti-slip knob 10. At the opposite end is an elongated block-like body 11 which forms the base on which the accessories or parts are mounted. As shown in Figure 3, the main adapter or mounting is indicated at 12 and is adapted to be bolted to the top of the base. Its intermediate portion is elevated as indicated at 13 to form a riser and this is provided with a guide slot 14. At one end of the slot, I provide opposed clearance notches 15. At the left hand end portion is what may be designated as a keeper notch 16. A flat spring 17 is adapted to underlie the left hand end portion of the adapter plate. It is therefore fashioned for conformation in shape to said plate. In fact, the left hand end portion of the spring is fastened down by the same bolt 18 which is utilized for holding both parts on the base. The free end portion of this spring, which extends beyond the clearance notches 15 is formed on one side with an extension 19 constituting a presser element which serves to allow the spring to be forced down with a suitable implement to facilitate placement and removal of the grapple or cant hook. This can hook is shown in Figure 5 and comprises a longitudinally bowed shank portion 20 which is of rectangular cross sectional shape to fit non-rotatably into the guide slot 14. The free end portion is provided with a pointed bill 21 adapted to engage the log to facilitate turning the log. The opposite end is provided with a T-head 22 which provides a retaining and fulcrum element and which is placed through the slot and against one end of the spring as shown in Figure 1. The spring 17 is in a sense a cover plate for the clearance notches 15. The clearance notches constitute the means for placing the T-head into the slot. When it is once in the slot the spring snaps back up and closes the opening formed by the notches 15 and retains the hook in operative position. This arrangement also allows the hook to be easily and bodily removed whenever its presence in the make-up is not desired. It is obvious, of course, that the presser element 19 extends out beyond the adjacent longitudinal end of the plate 13 so that it is accessible for actuation.

Attention is now invited to Figure 6 wherein it will be observed that the numeral 23 designates as a unit the bark severing and peeling or scaling device. This is preferably of one-piece construction, though it may be made in sections. It includes an attaching shank 24 bolted to one side of the base and at its outer end it is formed into a suitably shaped or curved blade 25 which is designed to extend more or less transversely across the longitudinal dimension of the log to permit the bark to be severed conveniently by moving the tool back and forth in a longitudinal direction somewhat as is done with a "draw knife". It will be noted that the intermediate or jointing portion 26 of the device 23 is of a peculiar curvature. That is to say, it dips down beyond the base and is located off to one side of the base so that it really forms an independent bark cutting hook. Both of the features 25 and 26 are formed with a suitable cutting edge 27.

As will be seen, when the shank 24 is connected with a side of the base part 11, the blade 25 will extend across the end of said base part in spaced relation thereto, with said blade part sloping downwardly toward said end from its upper edge to its beveled edge. It will also be seen that the connecting portion 26 is of substantially U-shape and extends outwardly and connects the blade part with the shank, and that the blade part and the U-shaped part are of greater width than the shank, and that the blade part is of substantially arcuate shape, with its convex face extending toward the end of the base part 11.

Calling attention now to Figure 7 it will be seen that this is a sort of a latch. It is formed from a length of spring wire 28 fashioned as indicated at 29 at one end to hold the hook up and out of the way as shown in Figure 2. The opposite end portion of the wire is coiled as indicated at 30 and fastened around the bolt 18. The terminal or left hand end is bent down to form a detent 31 which is fitted in the keeper notches 16 as shown in Figure 2. This is merely a simple mounting for the wire latch. As before stated, the cant hook can be bodily removed or it can be left in place and held in an out-of-the-way position through the instrumentality of this latch.

It is thought that the construction and operation of the tool will be quite clear after reading the detailed description in conjunction with the accompanying drawings. It follows, therefore that a more explicit description is deemed unnecessary.

Although I have shown and described certain specific embodiments of my invention, I am fully aware that many modifications thereof are possible. My invention, therefore, is not to be restricted except insofar as it is necessitated by the prior art and by the spirit of the following claims.

What is claimed is:

1. A device of the class described, comprising a handle, a substantially angle-shaped blade member including a shank and a blade part, means for connecting the shank to a side portion of the handle with the blade part extending across and spaced from the adjacent end of the handle, the lower edge of the blade part being beveled and said blade part sloping downwardly toward said end of the handle from its upper edge to its beveled edge.

2. A device of the class described, comprising a handle having a wide end portion, a substantially angle-shaped blade member including a shank and a blade part, means for connecting the shank to a side part of the wide portion of the handle with the blade part extending across and spaced from the end of said wide part of the handle, the blade portion having its lower edge beveled and the blade part sloping downwardly and toward said end of the wide part from its upper edge to its beveled edge and an outwardly extending substantially U-shaped portion connecting the blade part with the shank and having its lower edge beveled, the blade part and the U-shaped portion being of greater width than the shank and said blade part being of substantially arcuate-shape with its convex face extending toward the end of the wide part of the handle.

JAMES KROFTA.